Patented Feb. 25, 1930

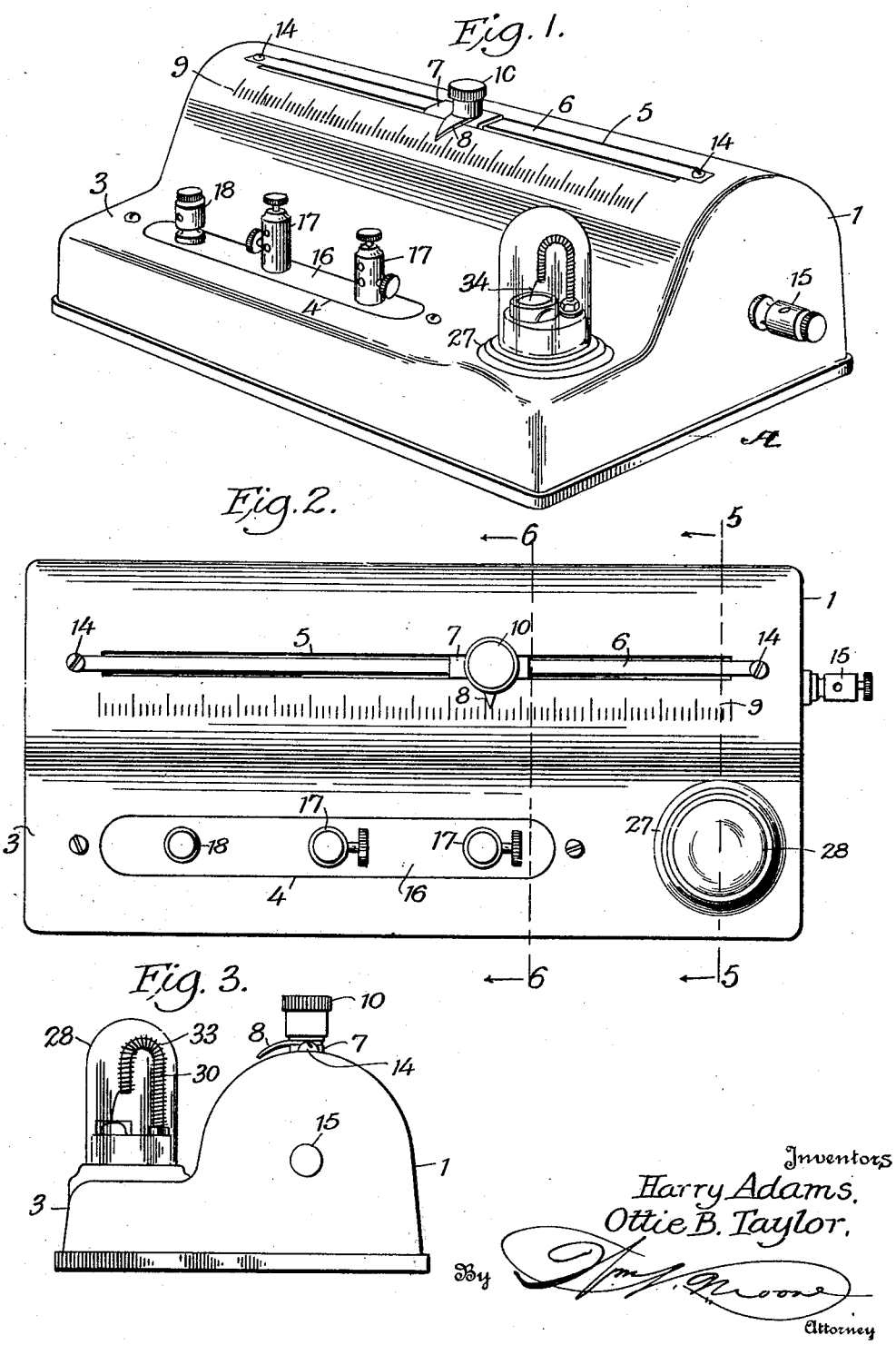

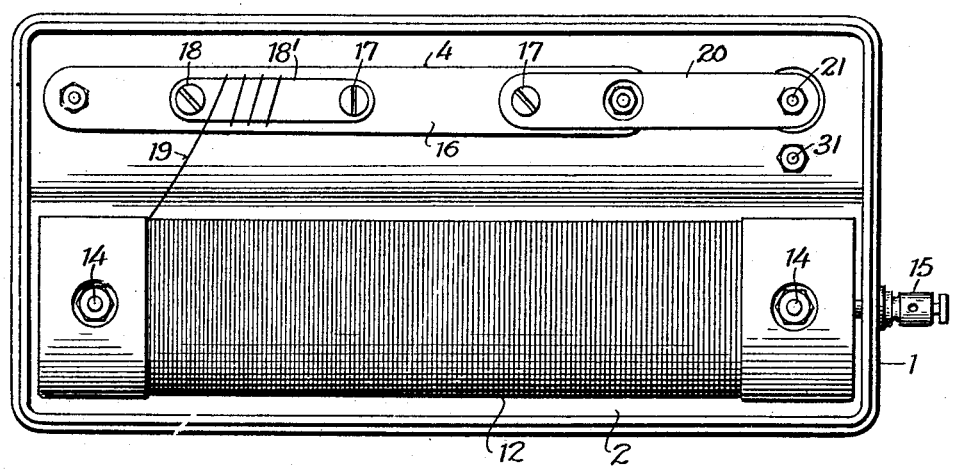
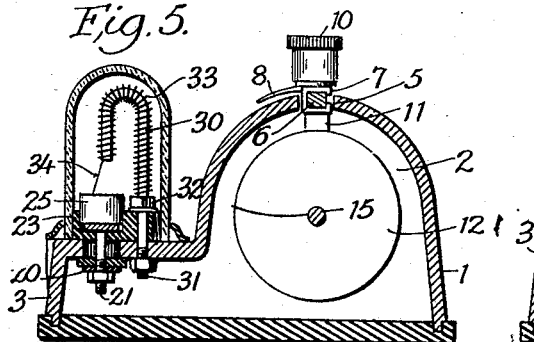
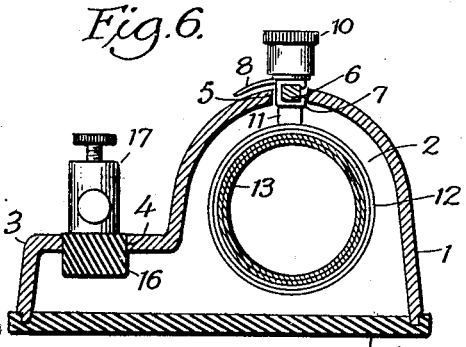
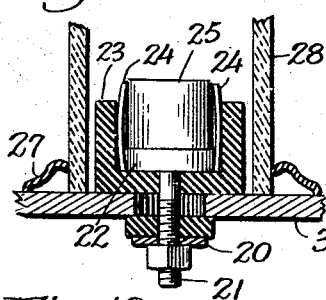
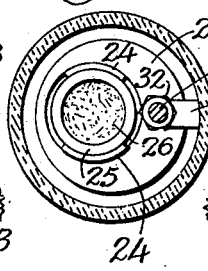
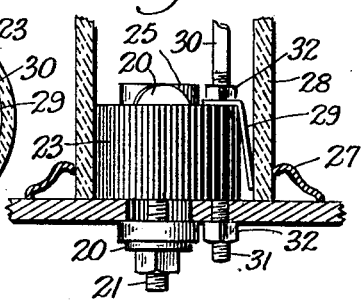
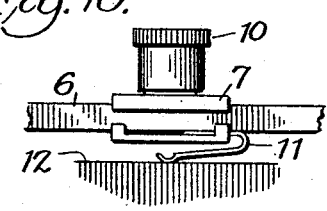

1,748,435

UNITED STATES PATENT OFFICE

HARRY ADAMS AND OTTIE B. TAYLOR, OF WASHINGTON, DISTRICT OF COLUMBIA

CRYSTAL RADIO APPARATUS

Application filed March 12, 1926. Serial No. 94,169.

Our invention relates to improvements in crystal radio sets or apparatus and refers particularly to an apparatus of this character which we are placing before the public under the name or title, "The crystal dyne", to distinguish our improvement in the trade and to guard against fraudulent imitations.

One object of our invention is the provision of a radio apparatus which will have a much longer reception range or distance than sets in present use, we having covered a distance of more than one hundred miles in a perfectly satisfactory manner as to clearness and volume of sound.

Another object of our invention is the provision of a set or apparatus in which the finest adjustment of the cat whisker is possible and which will absolutely remain in proper contact regardless of jar or hard usage.

Another object of our invention is the provision of a radio set or apparatus which can be tuned with ease and facility to suit conditions and which will provide for thorough protection of all parts of the apparatus.

Another object of our invention is the provision of a set or apparatus which will be compact and small in size, which will be of ornamental and attractive appearance, which can be manufactured at the lowest possible cost all things considered, and which in every respect will be thoroughly efficient and practical.

With the attainment of these objects in view, our invention consists of a radio set or apparatus embodying novel features of construction and arrangement of parts for service, substantially as described and claimed and as shown in the accompanying drawings, in which:

Figure 1 represents a perspective view of a crystal radio set or apparatus constructed in accordance with and embodying our invention.

Figure 2 represents a top plan view of the apparatus.

Figure 3 represents an end view.

Figure 4 represents a bottom plan view.

Figure 5 represents a sectional view taken on the line 5—5 of Figure 2.

Figure 6 represents a sectional view taken on the line 6—6 of Figure 2.

Figures 7, 8 and 9 represent detail views of the crystal, holder and associated parts to more clearly show the details of this important feature of our invention, and Figure 10 represents a detail view of the slider rod, the slider, and the tuning coil.

The casing is of the proper dimensions and consists of the raised portion 1, which provides the tuning coil chamber 2, and the flat or table portion 3, which is formed with the cavity or seat 4, said raised portion being provided in its upper face with a slot 5, in which is mounted the slider rod or guide 6, upon which moves the slider 7 having the indicator 8, which travels over the indicating scale 9, and is provided with the grasping or manipulating handle 10 and carries the contact 11, which engages the tuning coil 12, said tuning coil being mounted on the insulating tube 13, retained in place by the screws 14, which also serve as the fastening means for the guide 6.

Connected at one end of the casing or housing and associated with the tuning coil is the binding post 15, which provides the connection for the aerial, while in the cavity 4, is mounted the insulating block 16, of a special material manufactured by us and particularly adapted for the purpose, and in this block is mounted the phone connecting posts 17, and the ground connection or post 18, the plate 18' being employed to make connection with the phones and ground and through the medium of the terminal 19, connection with the tuning coil is provided.

From this construction it will be observed that all the important parts of our set are housed and protected and properly associated and connected with the insulating block or base 16, is the plate or bond 20, to the outer end of which is connected the threaded stem 21, which depends from the cup or holder 22, which is insulated by the block or case 23, and is provided with the pair of spring contacts 24, which engage and hold the cup 25, in which is contained the crystal 26, which is of a special material possessing numerous advantages and which is manufactured by us.

Surrounding the insulating block or case 23, is the rim or flange 27, which receives and retains the glass bulb or protecting tube 28, which is further engaged and retained by the spring clip 29, and covers the crystal as well as the curved post or member 30, which is mounted at its lower end 31 in the insulating block 23, and retained by the pair of securing nuts 32. The curved or bail shaped post, it will be noted, is in a vertical position and retained thus and upon said post is placed the conducting coil 33, whose free terminal 34, forms the crystal contact or cat's whisker of our invention.

The construction and arrangement of the crystal, the supporting post and the spring coil with cat's whisker forms one of the most important features of our invention and it will be noted that the inherent spring action of the coil causes the contact or cat's whisker to bear positively and under all conditions upon the crystal and in order to change the location of contact it is simply necessary to turn or twist the coil upon its support to bring the cat's whisker into contact with any desired point or place upon the face of the crystal, and under all conditions the contact is assured between the cat's whisker and the crystal, while permitting easy and ready removal of the coil with cat's whisker when found necessary.

The detector element or means of our improvement is of paramount importance and consists of the crystal and the contact members, said contact member consisting of a rigid or stiff support and a spring coil which is entirely arranged around the support throughout its length to give columnar rigidity to the entire body of the coil and allow the cat's whisker or free end of the coil to be adjustable and to bear under spring tension upon said crystal, this construction insuring the cat's whisker bearing positively at all times in proper relation to the crystal.

From the foregoing description taken in connection with the drawings, the operation of our set or apparatus will be readily understood, such operation being so well known and established that elaboration thereof here is not deemed necessary, but we claim particular advantage for the shape and construction of the casing, the arrangement of the tuning coil and associated elements and also for the construction of the crystal and the spring coil with contact or cat's whisker, as these features combine to produce a crystal radio set which will attain the highest degree of efficiency from every standpoint.

We claim:—

1. In radio apparatus, a detector element, consisting of a crystal, a vertical support contiguous to said crystal, said support having a curved portion at its upper end disposed parallel with the support, a contact member carried by said support and comprising a lower terminal bearing against said crystal, a coiled spring intermediate portion around said support, and a terminal which contacts with said crystal, the coiled spring portion holding the terminals in proper contact with the crystal and allowing rotary movement upon the support to permit the terminal to engage the crystal at different places.

2. In radio receiving apparatus, comprising a casing, a tuning coil, a contact and a crystal detector, said detector consisting of a crystal, a vertical support contiguous to said crystal, said support having a curved upper portion at its upper end disposed parallel with the support, a contact member carried by said support and comprising a lower terminal bearing against said crystal, a coiled spring intermediate portion around said support, and a terminal which contacts with said crystal, the coil spring portion holding the terminals in proper contact with the crystal and allowing rotary movement upon the support to permit the terminal to engage the crystal at different places.

In testimony whereof we hereunto affix our signatures.

HARRY ADAMS.
OTTIE B. TAYLOR.